(12) United States Patent
Kaneko

(10) Patent No.: US 10,908,379 B2
(45) Date of Patent: Feb. 2, 2021

(54) IMAGING DEVICE

(71) Applicant: Nittoh Inc., Suwa (JP)

(72) Inventor: Kohei Kaneko, Suwa (JP)

(73) Assignee: Nittoh Inc.

( * ) Notice: Subject to any disclaimer, the term of this patent is extended or adjusted under 35 U.S.C. 154(b) by 213 days.

(21) Appl. No.: 16/316,497

(22) PCT Filed: Jun. 28, 2017

(86) PCT No.: PCT/JP2017/023785
§ 371 (c)(1),
(2) Date: Jan. 9, 2019

(87) PCT Pub. No.: WO2018/012293
PCT Pub. Date: Jan. 18, 2018

(65) Prior Publication Data
US 2019/0293899 A1    Sep. 26, 2019

(30) Foreign Application Priority Data

Jul. 15, 2016 (JP) ................... 2016-139899

(51) Int. Cl.
G02B 7/02  (2006.01)
H04N 5/225  (2006.01)

(52) U.S. Cl.
CPC .............. G02B 7/021 (2013.01); G02B 7/02 (2013.01); H04N 5/225 (2013.01)

(58) Field of Classification Search
CPC ........... G02B 7/02; G02B 7/021; H04N 5/225
See application file for complete search history.

(56) References Cited

U.S. PATENT DOCUMENTS 9,176,298 B1 * 11/2015 Gustafson .............. G02B 7/008
2004/0223074 A1    11/2004 Takada

FOREIGN PATENT DOCUMENTS

| JP | H08-251348 A | 9/1996 |
| JP | 2004-272196 A | 9/2004 |
| JP | 2004-295119 A | 10/2004 |
| JP | 2005-266586 A | 9/2005 |
| JP | 2010-074626 A | 4/2010 |
| JP | 2013-242411 A | 12/2013 |

* cited by examiner

*Primary Examiner* — Joseph P Martinez
*Assistant Examiner* — Vipin Patel
(74) *Attorney, Agent, or Firm* — Harness, Dickey & Pierce, P.L.C.

(57) ABSTRACT

An imaging device is provided that includes: a lens barrel, an element holder adhesively secured to one end of the lens barrel while holding an imaging element; and an elastic body disposed between the lens barrel and the element holder. The lens barrel has formed thereon a projection projecting toward the element holder. The element holder has formed therein an insertion hole into which the projection is inserted. The elastic body is fitted to the projection with the projection inserted into an insertion hole in the elastic body. In the imaging device, an outer peripheral surface of the projection and an inner peripheral surface of the insertion hole are in contact with each other, and the element holder is in contact with the elastic body on the periphery of the insertion hole. An adhesive is filled between the projection and the insertion hole.

13 Claims, 5 Drawing Sheets

IMAGING DEVICE

This application is a U.S. National Stage Application of International Application No. PCT/JP2017/023785, filed on Jun. 28, 2017, and published in Japanese as WO 2018/012293 A1 on Jan. 18, 2018 and claims priority to Japanese Application No. 2016-139899, filed on Jul. 15, 2016. The entire disclosures of the above applications are incorporated herein by reference.

BACKGROUND

Technical Field

The present invention relates to an imaging device including a lens and an imaging element.

Related Art

Conventionally, an imaging device including a lens barrel for holding a plurality of lenses and an imaging unit having an imaging element has been known (see, for example, Japanese Patent Application Laid-open No. 2013-242411). In an imaging device such as the imaging device disclosed in Japanese Patent Application Laid-open No. 2013-242411, in general, in order to suppress the occurrence of partial blur in the imaging device, after the relative position between the lens barrel and the imaging unit is adjusted (specifically, after the inclination of the imaging element relative to the optical axis of the lens is adjusted) while checking an image signal acquired by the imaging element, an adhesive applied between the lens barrel and the imaging unit is cured to secure the lens barrel and the imaging unit to each other at the time of assembling the imaging device.

The study by the inventors of the present invention has revealed that when the lens barrel and the imaging unit are adhesively secured after the inclination of the imaging element relative to the optical axis of the lens is adjusted, although the inclination of the imaging element relative to the optical axis of the lens is adjusted, the inclination of the imaging element relative to the optical axis of the lens may be moved after the adhesive between the lens barrel and the imaging unit is cured due to shrinkage of the adhesive when the adhesive is cured.

It is therefore an object of the present invention to provide an imaging device capable of maintaining the inclination of an imaging element adjusted relative to the optical axis of a lens even if a lens barrel for holding the lens and an element holder for holding the imaging element are adhesively secured to each other after adjusting the inclination of the imaging element relative to the optical axis of the lens.

SUMMARY

In order to solve the above-mentioned problem, an imaging device of the present invention includes: a lens barrel for holding a lens; an element holder adhesively secured to one end of the lens barrel in an optical axis direction of the lens while holding an imaging element; and an elastic body disposed between the lens barrel and the element holder in the optical axis direction, in which one of the lens barrel and the element holder has formed thereon a projection projecting in the optical axis direction toward the other of the lens barrel and the element holder, the other of the lens barrel and the element holder has formed therein an insertion hole into which the projection is inserted, the elastic body has formed therein a through hole through which the projection is inserted, the elastic body is fitted to the projection with the projection inserted in the through hole, an outer peripheral surface of the projection and an inner peripheral surface of the through hole are in contact with each other, the other of the lens barrel and the element holder in which the insertion hole is formed and the elastic body fitted to the projection are in contact with each other on a periphery of the insertion hole, and an adhesive for fixing the lens barrel and the element holder is filled between the outer peripheral surface of the projection and the inner peripheral surface of the insertion hole.

In the imaging device of the present invention, the projection is formed on one of the lens barrel and the element holder, and the insertion hole into which the projection is inserted is formed on the other of the lens barrel and the element holder. In the present invention, the elastic body disposed between the lens barrel and the element holder in the optical axis direction is fitted to the projection with the projection inserted in the through hole, and the outer peripheral surface of the projection and the inner peripheral surface of the through hole are in contact with each other. In the present invention, the other of the lens barrel and the element holder in which the insertion hole is formed is in contact with the elastic body fitted to the projection on the periphery of the insertion hole. Thus, in the present invention, when an adhesive for fixing the lens barrel and the element holder is poured between the outer peripheral surface of the projection and the inner peripheral surface of the insertion hole, the adhesive can be prevented from easily flowing between the lens barrel and the element holder in the optical axis direction.

Consequently, in the present invention, the lens barrel and the element holder can be prevented from being easily secured by the adhesive at locations other than between the outer peripheral surface of the projection and the inner peripheral surface of the insertion hole. Thus, in the present invention, for example, even if the adhesive is shrunk when the adhesive is poured between the outer peripheral surface of the projection and the inner peripheral surface of the insertion hole and the adhesive is cured after the inclination of the imaging element relative to the optical axis of the lens is adjusted, the shift of the relative position between the lens barrel and the element holder in the optical axis direction can be suppressed. As a result, in the present invention, the inclination of the imaging element adjusted relative to the optical axis of the lens can be maintained even if the lens barrel and the element holder are adhesively secured to each other after adjusting the inclination of the imaging element relative to the optical axis of the lens.

In the present invention, it is preferred that the elastic body be formed from polyurethane foam. This configuration can relatively reduce the hardness of the elastic body while securing the elasticity of the elastic body. Consequently, even if the elastic body is disposed between the lens barrel and the element holder in the optical axis direction, the elastic body can be easily deformed when the inclination of the imaging element relative to the optical axis of the lens is adjusted, and as a result, the work of adjusting the inclination of the imaging element relative to the optical axis of the lens is facilitated.

In the present invention, it is preferred that the projection be formed into a columnar shape, and the insertion hole be formed into a circular hole shape. When the adhesive filled between the outer peripheral surface of the projection and the inner peripheral surface of the insertion hole is cured, stress due to shrinkage of the adhesive acts between the outer peripheral surface of the projection and the inner peripheral surface of the insertion hole, but such a configuration enables the magnitude of the stress acting between the outer peripheral surface of the projection and the inner peripheral surface of the insertion hole to be uniform in the entire range in the circumferential direction of the projection.

In the present invention, it is preferred that a tapered surface having outer diameter that becomes larger on the side opposite to the projecting direction of the projection be formed on a root part of the projection. Such a configuration can increase the degree of adhesion between the inner peripheral surface of the through hole in the elastic body and the outer peripheral surface of the projection at the root part of the projection. Consequently, when the adhesive for securing the lens barrel and the element holder is poured between the outer peripheral surface of the projection and the inner peripheral surface of the insertion hole, the adhesive can be prevented from easily flowing between one of the lens barrel and the element holder on which the projection is formed and the elastic body in the optical axis direction. Thus, the shift of the relative position between the lens barrel and the element holder in the optical axis direction caused when the adhesive shrinks can be effectively suppressed.

In the present invention, it is preferred that a difference between an outer diameter of the projection and an inner diameter of the insertion hole be equal to or more than twice a margin for adjusting a relative position of the element holder relative to the lens barrel in a direction orthogonal to the optical axis direction, and the inner diameter of the insertion hole be equal to or smaller than five times the outer diameter of the projection. With such a configuration, the inner diameter of the insertion hole is equal to or smaller than five times the outer diameter of the projection, and hence the stress that acts between the outer peripheral surface of the projection and the inner peripheral surface of the insertion hole when the adhesive shrinks is less likely to be nonuniform in the circumferential direction of the projection.

In the present invention, for example, the projection includes a plurality of projections and the insertion hole include a plurality of insertion holes, the projections and the insertion holes being formed at three locations. In this case, the lens barrel and the element holder adhere at the three locations, and hence the fixed state of the lens barrel and the element holder can be made stable.

In the present invention, it is preferred that the projection be formed on the lens barrel, the insertion hole be formed in the element holder, and the insertion hole be a through hole passing through the element holder in the optical axis direction. With such a configuration, the projection only needs to be formed on one end surface of the lens barrel in the optical axis direction, and hence the configuration of the lens barrel can be simplified as compared with the case where the projection is formed on the element holder and the insertion hole is formed in the lens barrel.

In order to solve the above-mentioned problem, an imaging device of the present invention includes: a lens barrel for holding a lens; an element holder adhesively secured to one end of the lens barrel in an optical axis direction of the lens while holding an imaging element; and an elastic body disposed between the lens barrel and the element holder in the optical axis direction, in which one of the lens barrel and the element holder has formed thereon a projection projecting in the optical axis direction toward the other of the lens barrel and the element holder, the other of the lens barrel and the element holder has formed therein an insertion hole into which the projection is inserted, the elastic body has formed therein a through hole through which the projection is inserted, the elastic body is disposed on an inner side and an outer side of an inner peripheral edge of the insertion hole, a part of the elastic body that is disposed on the outer side of the inner peripheral edge of the insertion hole is sandwiched between the lens barrel and the element holder in the optical axis direction, and an adhesive for fixing the lens barrel and the element holder is filled between an outer peripheral surface of the projection and an inner peripheral surface of the insertion hole.

In the imaging device of the present invention, the projection is formed on one of the lens barrel and the element holder, and the insertion hole into which the projection is inserted is formed in the other of the lens barrel and the element holder. In the present invention, the through hole into which the projection is inserted is formed in the elastic body disposed between the lens barrel and the element holder in the optical axis direction, and the elastic body is disposed on the inner side and the outer side of the inner peripheral edge of the insertion hole. In the present invention, a part of the elastic body that is disposed on the outer side of the inner peripheral edge of the insertion hole is sandwiched between the lens barrel and the element holder in the optical axis direction. Thus, in the present invention, when the adhesive for securing the lens barrel and the element holder is poured between the outer peripheral surface of the projection and the inner peripheral surface of the insertion hole, the adhesive can be prevented from easily flowing between the lens barrel and the element holder in the optical axis direction.

Consequently, in the present invention, the lens barrel and the element holder can be prevented from being easily secured by the adhesive at locations other than between the outer peripheral surface of the projection and the inner peripheral surface of the insertion hole. Specifically, the lens barrel and the element holder can be prevented from being easily secured by the adhesive at a part where the lens barrel and the element holder are opposed in the optical axis direction. Thus, in the present invention, for example, even if the adhesive is shrunk when the adhesive is poured between the outer peripheral surface of the projection and the inner peripheral surface of the insertion hole and the adhesive is cured after the inclination of the imaging element relative to the optical axis of the lens is adjusted, the shift of the relative position between the lens barrel and the element holder in the optical axis direction can be suppressed. As a result, in the present invention, the inclination of the imaging element adjusted relative to the optical axis of the lens can be maintained even if the lens barrel and the element holder are adhesively secured to each other after adjusting the inclination of the imaging element relative to the optical axis of the lens.

Advantageous Effects of Invention

As described above, with the imaging device of the present invention, the inclination of the imaging element adjusted relative to the optical axis of the lens can be maintained even if the lens barrel for holding the lens and the element holder for holding the imaging element are adhesively secured to each other after adjusting the inclination of the imaging element relative to the optical axis of the lens.

DETAILED DESCRIPTION

Embodiments of the present invention are described below with reference to the drawings.

Configuration of Imaging Device

Figure 1:
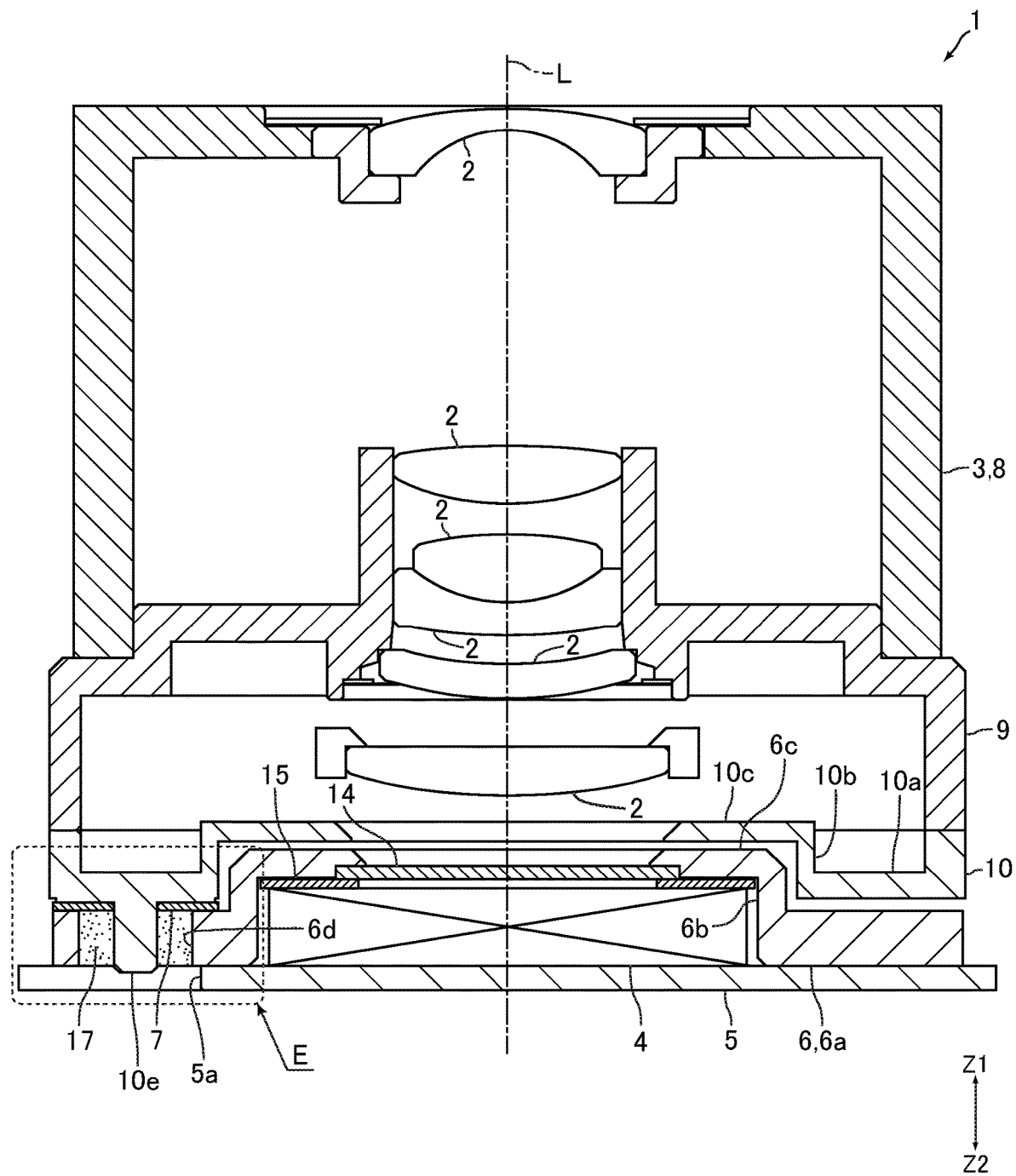
FIG. 1 is a sectional view of an imaging device according to an embodiment of the present invention.
Figure 2:
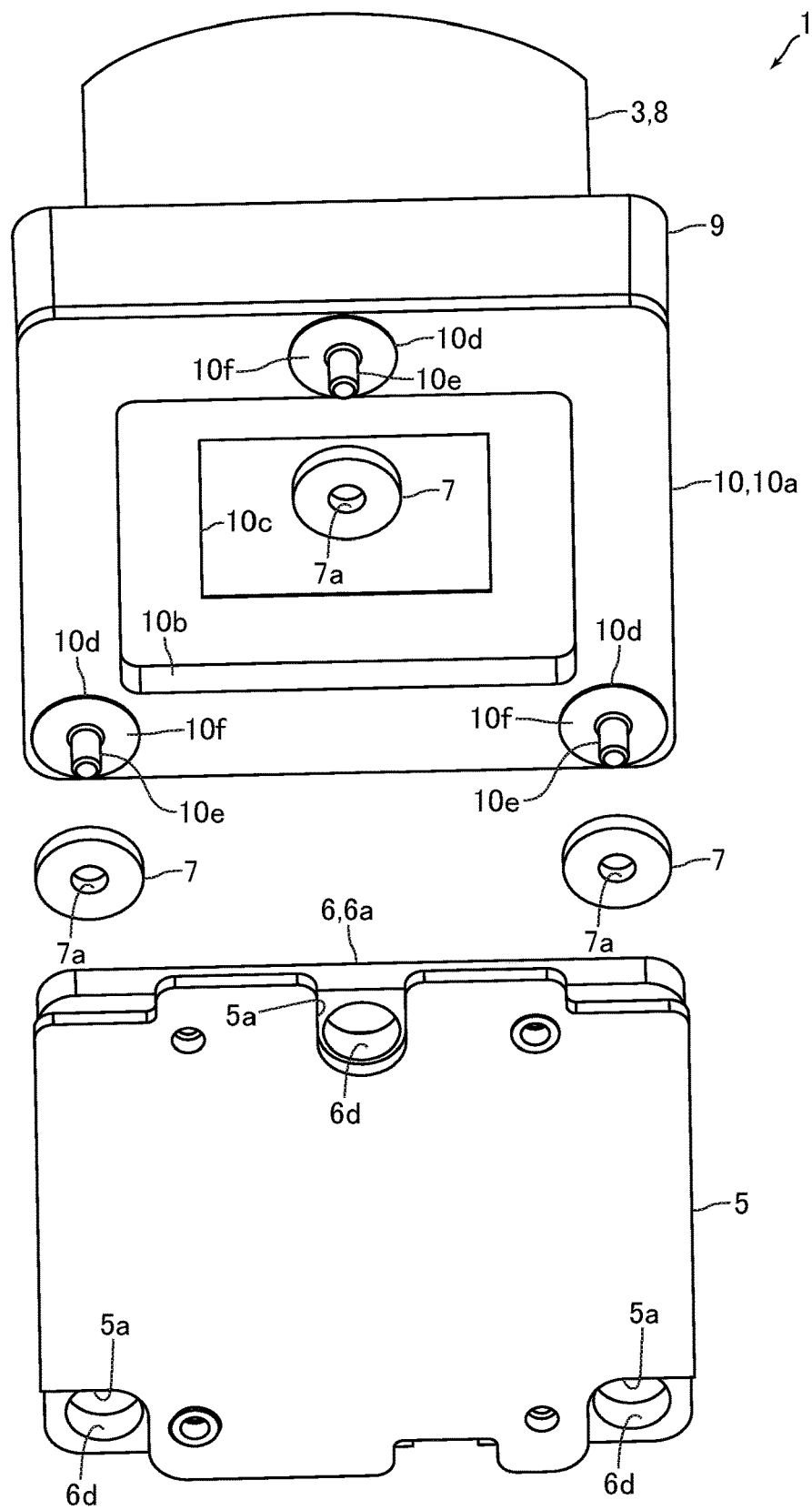
FIG. 2 is an exploded perspective view of the imaging device illustrated in FIG. 1.
Figure 3:
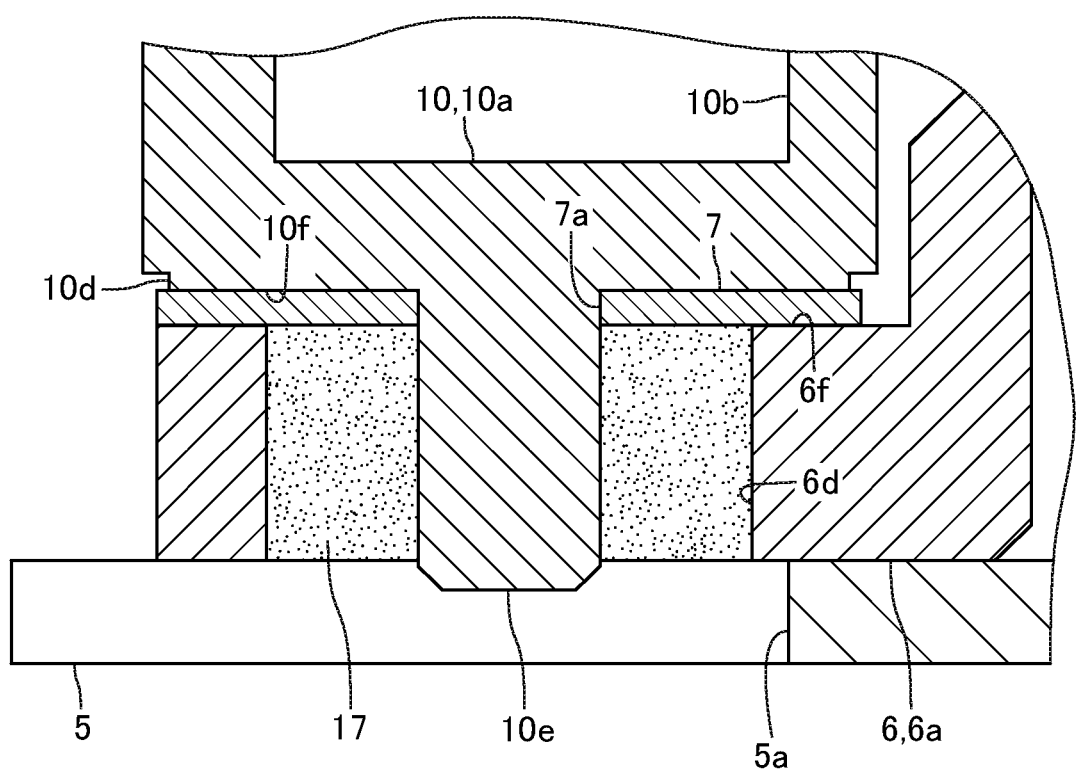
FIG. 3 is an enlarged view of a part E in FIG. 1.

FIG. 1 is a sectional view of an imaging device 1 according to an embodiment of the present invention. FIG. 2 is an exploded perspective view of the imaging device 1 illustrated in FIG. 1. FIG. 3 is an enlarged view of a part E in FIG. 1.

The imaging device 1 in the present embodiment includes a plurality of lenses 2, a lens barrel 3 for holding the lenses 2, an imaging element 4 such as a C-MOS image sensor, a circuit substrate 5 on which the imaging element 4 is mounted, an element holder 6 for holding the imaging element 4 through the circuit substrate 5, and an elastic body 7 disposed between the lens barrel 3 and the element holder 6 in a direction of an optical axis L (optical axis direction) of the lens 2. When one side in the optical axis direction is a subject side and the other side in the optical axis direction is a side opposite to the subject (imaging side), the lens barrel 3 is disposed on the subject side and the element holder 6 is disposed on the side opposite to the subject. In the following description, the subject side (Z1-direction side in FIG. 1) is a "front" side, and the side opposite to the subject (Z2-direction side in FIG. 1) is a "rear" side.

The lens barrel 3 includes two lens holding bodies 8 and 9 for holding the lenses 2, and a cover member 10 constituting a rear end side part of the lens barrel 3. The lens holding body 8, the lens holding body 9, and the cover member 10 are fixed to one another while being combined in a front-back direction (optical axis direction). For example, one lens 2 is fixed to the lens holding body 8 disposed on the front side, and, for example, four lenses 2 are fixed to the lens holding body 9 disposed on the rear side. The lens 2 disposed on the rearmost side is a focus lens. A focusing mechanism (not shown) for moving the lens 2 (focus lens) in the optical axis direction is disposed inside the lens barrel 3. A shutter (not shown) and a shutter drive mechanism (not shown) are disposed inside the lens barrel 3.

The cover member 10 includes a base portion 10a formed into a rectangular frame shape, and a cylindrical portion 10b having a flat rectangular cylindrical shape rising to the front side from the inner peripheral end of the base portion 10a. The cover member 10 includes a front surface portion 10c formed into a rectangular frame shape and connected to the front end of the cylindrical portion 10b. An outer peripheral end of the front surface portion 10c is connected to the front end of the cylindrical portion 10b. The rear surface of the base portion 10a is a flat plane orthogonal to the front-back direction (optical axis direction). A protrusion 10d slightly projecting toward the rear side is formed on the rear surface of the base portion 10a. A projection (boss) 10e projecting toward the rear side is formed on the rear surface of the base portion 10a. In other words, the projection 10e projecting in the optical axis direction toward the element holder 6 is formed on the lens barrel 3.

The protrusion 10d is formed into a thin disc shape, and a slight step is formed on the rear surface of the base portion 10a. The projection 10e is formed into a columnar shape. The projection 10e is formed so as to protrude from the protrusion 10d toward the rear side. The axial direction of the projection 10e formed into a columnar shape is parallel to the front-back direction. When seen from the front-back direction, the center of the protrusion 10d is aligned with the center of the projection 10e. The outer diameter of the protrusion 10d is larger than the outer diameter of the projection 10e. The rear surface 10f of the protrusion 10d is a flat surface orthogonal to the front-back direction. The rear surface 10f is formed into a ring shape surrounding the projection 10e.

The protrusions 10d and the projections 10e are formed at three locations. Specifically, as illustrated in FIG. 2, the protrusions 10d and the projections 10e are formed at two locations on both ends of one long-side part of the base portion 10a formed into a rectangular frame shape and at one location at the center position of the other long-side part. When seen from the front-back direction, the protrusions 10d and the projections 10e formed at two locations on both ends of one long-side part of the base portion 10a are disposed symmetrically about a line parallel to the short-side direction of the base portion 10a and passing through the optical axis L. When seen from the front-back direction, the protrusion 10d and the projection 10e formed at one location at the center position of the other long-side part of the base portion 10a are disposed at a position at which the line passes. When seen from the front-back direction, the protrusions 10d and the projection 10e located at the three locations are disposed at equal distances from a line parallel to the long-side direction of the base portion 10a and passing through the optical axis L. In the present embodiment, when seen from the front-back direction, a straight line connecting the projections 10e formed at the three locations forms an isosceles triangle.

The element holder 6 includes a base portion 6a formed into a rectangular frame shape and cylindrical portions 6b having a flat rectangular cylindrical shape rising to the front side from the inner peripheral end of the base portion 6a. The element holder 6 includes a front surface portion 6c formed into a rectangular frame shape and connected to the front end of the cylindrical portion 6b. An outer peripheral end of the front surface portion 6c is connected to the front end of the cylindrical portion 6b. The profile of the base portion 6a is substantially the same as the profile of the base portion 10a of the cover member 10. The front surface of the base portion 6a is a flat plane substantially orthogonal to the front-back direction. In the base portion 6a, an insertion hole 6d into which the projection 10e is inserted is formed.

The insertion hole 6d is formed into a circular hole shape such that the diameter on the inner side of the insertion hole 6d (the diameter of the hole, that is, the inner diameter) is larger than the diameter on the outer side of the projection 10e (the diameter of the outer circumference, that is, the outer diameter). For example, the inner diameter of the insertion hole 6d is about three times the outer diameter of the projection 10e. The inner diameter of the insertion hole 6d is smaller than the outer diameter of the protrusion 10d. The insertion hole 6d passes through the base portion 6a in the front-back direction. In other words, the insertion hole 6d is a through hole passing through the element holder 6 in the front-back direction. In the present embodiment, as described later, the relative position of the element holder 6 relative to the lens barrel 3 in a direction orthogonal to the optical axis direction is adjusted. The difference between the outer diameter of the projection 10e and the inner diameter of the insertion hole 6d is equal to or more than twice a margin for adjusting the relative position of the element holder 6 relative to the lens barrel 3 in the direction orthogonal to the optical axis direction.

The insertion holes 6d are formed at three locations. Specifically, the insertion holes 6d are formed at two locations on both ends of one long-side part of the base portion 6a formed into a rectangular frame shape and at one location at the center position of the other long-side part thereof so as to correspond to the arrangement positions of the projections 10e. When seen from the front-back direction, the insertion holes 6d formed at two locations on both ends of one long-side part of the base portion 6a are disposed symmetrically about a line parallel to the short-side direction of the imaging element 4 formed into a rectangular shape and passing through the center of the imaging element 4. When seen from the front-back direction, the insertion hole 6d formed at one location at the center position of the other long-side part of the base portion 6a is disposed at a position at which the line passes. When seen from the front-back direction, the insertion holes 6d formed at the three locations are disposed at equal distances from a line parallel to the long-side direction of the imaging element 4 and passing through the center of the imaging element 4. In the present embodiment, when seen from the front-back direction, a straight line connecting the insertion holes 6d formed at the three locations forms an isosceles triangle.

The circuit substrate 5 is a rigid substrate formed into a substantially rectangular flat plate shape. The circuit substrate 5 is fixed to the element holder 6 with the front surface of the circuit substrate 5 in contact with the rear surface of the base portion 6a of the element holder 6. The imaging element 4 is mounted at the center position of the front surface of the circuit substrate 5. The imaging element 4 is disposed on the inner peripheral side of the cylindrical portion 6b of the element holder 6, and is disposed behind the front surface portion 6c of the element holder 6. Note that a notch 5a is formed in the circuit substrate 5 at a position corresponding to the insertion hole 6d such that the rear side of the insertion hole 6d is not covered with the circuit substrate 5.

A filter 14 for covering an imaging surface of the imaging element 4 is fixed to the front surface portion 6c of the element holder 6. For example, the filter 14 is a lowpass filter or an IR cut filter. An elastic body 15 formed into a ring shape is disposed between the imaging element 4 and the front surface portion 6c in the front-back direction. The elastic body 15 is formed from polyurethane foam, which is foamed synthetic rubber made from urethane rubber. Specifically, the elastic body 15 is formed from Moltoprene or PORON. The elastic body 15 serves to prevent dust from entering the imaging surface of the imaging element 4.

The elastic body 7 is formed from polyurethane foam. Specifically, the elastic body 7 is formed from Moltoprene or PORON. The elastic body 7 is formed into a flat plate shape and a ring shape. Specifically, a through hole 7a passing through the elastic body 7 is formed in the elastic body 7, and the through hole 7a is formed into a circular hole shape. The inner diameter of the through hole 7a formed on the inner peripheral side of the elastic body 7 (that is, the inner diameter of the elastic body 7) is substantially the same as the outer diameter of the projection 10e or slightly smaller than the outer diameter of the projection 10e. The inner diameter of the through hole 7a is smaller than the inner diameter of the insertion hole 6d. The outer diameter of the elastic body 7 is larger than the inner diameter of the insertion hole 6d, and the entire outer peripheral surface of the elastic body 7 is disposed on the outer peripheral side of the inner peripheral surface of the insertion hole 6d. In other words, the elastic body 7 is disposed on the inner side and the outer side of the inner peripheral edge of the insertion hole 6d. The outer diameter of the elastic body 7 is larger than the outer diameter of the protrusion 10d.

As described above, the elastic body 7 is disposed between the lens barrel 3 and the element holder 6. Specifically, the elastic bodies 7 are disposed at three locations between the lens barrel 3 and the element holder 6 with the projections 10e inserted in the through holes 7a (more specifically, with a root part of the projection 10e disposed on the inner peripheral side of the through hole 7a). A part of the elastic body 7 that is disposed on the outer side of the inner peripheral edge of the insertion hole 6d is sandwiched between the lens barrel 3 and the element holder 6 in the front-back direction. The elastic body 7 is fitted to the projection 10e with the projection 10e inserted in the through hole 7a. In other words, the elastic body 7 is held by the projection 10e.

The front surface of the elastic body 7 is in contact with the rear surface 10f of the protrusion 10d. An outer peripheral part (radially outer part) of the rear surface of the elastic body 7 is in contact with the front surface of the base portion 6a. As described above, the elastic body 7 is formed into a ring shape, and hence the elastic body 7 is in contact with the front surface of the base portion 6a in a ring pattern on the periphery of the insertion hole 6d. In other words, the elastic body 7 fitted to the projection 10e and the element holder 6 are in contact with each other on the periphery of the insertion hole 6d. The rear surface 10f in the present embodiment is a first contact portion with which the elastic body 7 contacts. As described above, the rear surface 10f is formed so as to surround the projection 10e. In the present embodiment, a part of the front surface of the base portion 6a with which the elastic body 7 contacts is a contact surface 6f as a second contact portion. The contact surface 6f is formed along the entire circumference of the edge of the insertion hole 6d. In other words, the contact surface 6f is a ring-shaped part surrounding the insertion hole 6d.

The element holder 6 is adhesively secured to the rear end of the lens barrel 3. With the element holder 6 adhesively secured to the lens barrel 3, the projection 10e is inserted into the insertion hole 6d. An adhesive 17 for fixing the lens barrel 3 and the element holder 6 is filled between the outer peripheral surface of the projection 10e and the inner peripheral surface of the insertion hole 6d. For example, the adhesive 17 is an ultraviolet curable adhesive. Note that it is preferred that the adhesive 17 be filled in the entire insertion hole 6d over the entire range in the circumferential direction of the projection 10e between the outer peripheral surface of the projection 10e and the inner peripheral surface of the insertion hole 6d. The adhesive 17 is not necessarily required to be filled in the entire insertion hole 6d, and a part where the adhesive 17 is not filled may be present on the rear end side of the insertion hole 6d or the front end side of the insertion hole 6d.

An outer peripheral part of the elastic body 7 is pressed by the contact surface 6f and the rear surface 10f. At least an outer peripheral part (a part in contact with the contact surface 6f) of the elastic body 7 is disposed between the lens barrel 3 and the element holder 6 while being slightly crushed in the front-back direction (that is, while being slightly shrunk in the front-back direction). An outer peripheral part of the rear surface of the elastic body 7 is in contact with the contact surface 6f over the entire range in the circumferential direction of the insertion hole 6d. In other words, a part of the front surface of the base portion 6a on the outer peripheral side of the insertion hole 6d is in contact with the elastic body 7 over the entire circumference. The entire front surface of the elastic body 7 is in contact with the rear surface 10f. As described above, the inner diameter of the through hole 7a is substantially the same as the outer diameter of the projection 10e or slightly smaller than the outer diameter of the projection 10e, and the inner peripheral surface of the through hole 7a is in contact with the outer peripheral surface of the projection 10e over the entire range in the circumferential direction of the projection 10e. In this manner, the front end side of the insertion hole 6d is closed by the projection 10e and the elastic body 7.

Fixing Work of Element Holder

For assembly of the imaging device 1, first, the lens 2 and a focusing mechanism or the like are incorporated into the lens barrel 3. The circuit substrate 5 having the imaging element 4 mounted thereon and the filter 14 or the like are incorporated into the element holder 6. After that, the projection 10e is inserted in the through hole 7a, and the elastic body 7 is fitted to the projection 10e. In other words, the elastic body 7 is fitted to the lens barrel 3. After that, the lens barrel 3 and the element holder 6 combined with the elastic body 7 sandwiched between the rear surface 10f and the contact surface 6f are mounted to an adjustment device. The adjustment device is a device for adjusting the inclination of the imaging element 4 relative to the optical axis L (more specifically, the inclination of the imaging surface of the imaging element 4 relative to the optical axis L). The lens barrel 3 and the element holder 6 are mounted to the adjustment device such that an outer peripheral part of the elastic body 7 is pressed by the contact surface 6f and the rear surface 10f. Thus, with the lens barrel 3 and the element holder 6 mounted to the adjustment device, at least an outer peripheral part of the elastic body 7 is slightly crushed in the front-back direction.

In this state, in the adjustment device, the relative position between the lens barrel 3 and the element holder 6 is adjusted (alignment adjustment is performed) while checking an image signal acquired by the imaging element 4, and the inclination of the imaging element 4 relative to the optical axis L is adjusted. After that, the adhesive 17 is poured between the outer peripheral surface of the projection 10e and the inner peripheral surface of the insertion hole 6d from behind the insertion hole 6d. Ultraviolet rays are applied to the adhesive 17 to cure the adhesive 17. When the adhesive 17 is cured, the element holder 6 is fixed to the lens barrel 3.

Note that, after the adhesive 17 is poured between the outer peripheral surface of the projection 10e and the inner peripheral surface of the insertion hole 6d, in the adjustment device, the relative position between the lens barrel 3 and the element holder 6 may be adjusted while checking an image signal acquired by the imaging element 4, and the adhesive 17 may be cured. In the adjustment device, the relative position between the optical axis L and the imaging surface of the imaging element 4 in a direction orthogonal to the optical axis direction is also adjusted. Specifically, in the adjustment device, the relative position of the element holder 6 relative to the lens barrel 3 in the direction orthogonal to the optical axis direction is also adjusted. In the present embodiment, the outer diameter of the elastic body 7 is set such that a part of the outer peripheral surface of the elastic body 7 is not disposed on the inner side of the inner peripheral surface of the insertion hole 6d even when the relative position between the optical axis L and the imaging surface of the imaging element 4 in the direction orthogonal to the optical axis direction is adjusted.

Main Effects of the Present Embodiment

As described above, in the present embodiment, the projection 10e is formed on the lens barrel 3, and the insertion hole 6d into which the projection 10e is inserted is formed in the element holder 6. In the present embodiment, the elastic body 7 is fitted to the projection 10e in the state in which the projection 10e is inserted in the through hole 7a, and the outer peripheral surface of the projection 10e and the inner peripheral surface of the through hole 7a are in contact with each other. In the present embodiment, the elastic body 7 fitted to the projection 10e and the element holder 6 are in contact with each other on the periphery of the insertion hole 6d. Specifically, in the present embodiment, the front end side of the insertion hole 6d is closed by the projection 10e and the elastic body 7. Thus, in the present embodiment, when the adhesive 17 is poured between the outer peripheral surface of the projection 10e and the inner peripheral surface of the insertion hole 6d, the adhesive 17 can be prevented from easily flowing between the front surface of the elastic body 7 and the rear surface 10f.

Thus, in the present embodiment, the lens barrel 3 and the element holder 6 can be prevented from being easily secured by the adhesive 17 at locations other than between the outer peripheral surface of the projection 10e and the inner peripheral surface of the insertion hole 6d. Consequently, in the present embodiment, even if the adhesive 17 shrinks when the adhesive 17 is poured between the outer peripheral surface of the projection 10e and the inner peripheral surface of the insertion hole 6d and the adhesive 17 is cured after the inclination of the imaging element 4 relative to the optical axis L of the lens 2 is adjusted, the shift of the relative position between the lens barrel 3 and the element holder 6 in the optical axis direction can be suppressed. As a result, in the present embodiment, even if the lens barrel 3 and the element holder 6 are adhesively secured to each other after adjusting the inclination of the imaging element 4 relative to the optical axis L of the lens 2, the inclination of the imaging element 4 adjusted relative to the optical axis L of the lens 2 can be maintained.

In the present embodiment, the inner diameter of the through hole 7a is substantially the same as the outer diameter of the projection 10e or slightly smaller than the outer diameter of the projection 10e. Thus, in the present embodiment, the inner peripheral surface of the through hole 7a and the outer peripheral surface of the projection 10e can be brought into contact with each other without any gap. Consequently, in the present embodiment, the adhesive 17 can be prevented from passing between the inner peripheral surface of the through hole 7a and the outer peripheral surface of the projection 10e to flow between front surface of the elastic body 7 and the rear surface 10f. Note that, when the inner diameter of the through hole 7a is slightly smaller than the outer diameter of the projection 10e, the degree of adhesion between the inner peripheral surface of the through hole 7a and the outer peripheral surface of the projection 10e can be increased, and hence the adhesive 17 can be effectively prevented from passing between the inner peripheral surface of the through hole 7a and the outer peripheral surface of the projection 10e to flow between the front surface of the elastic body 7 and the rear surface 10f.

In the present embodiment, when the inclination of the imaging element 4 relative to the optical axis L is adjusted, an outer peripheral part of the elastic body 7 having elasticity is pressed between the contact surface 6f and the rear surface 10f, and is slightly crushed in the front-back direction. Thus, in the present embodiment, even if the relative position between the lens barrel 3 and the element holder 6 in the optical axis direction has changed when adjusting the inclination of the imaging element 4 relative to the optical axis L, the contact state between a part of the contact surface 6f on the periphery of the insertion hole 6d and the elastic body 7 can be maintained. Consequently, in the present embodiment, even when the adhesive 17 is poured between the outer peripheral surface of the projection 10e and the inner peripheral surface of the insertion hole 6d after the inclination of the imaging element 4 relative to the optical axis L is adjusted, the adhesive 17 can be prevented from passing between the rear surface of the elastic body 7 and the contact surface 6f to flow between the front surface of the elastic body 7 and the rear surface 10f.

Note that, as described above, the relative position between the lens barrel 3 and the element holder 6 can be adjusted with the adhesive 17 poured between the outer peripheral surface of the projection 10e and the inner peripheral surface of the insertion hole 6d. In this case, the adhesive 17 may flow between the rear surface of the elastic body 7 and the contact surface 6f during the adjustment. However, even in this case, the contact state between one part of the contact surface 6f and the rear surface of the elastic body 7 can be maintained, and hence the adhesive 17 can be prevented from passing between the rear surface of the elastic body 7 and the contact surface 6f. Even in this case, the adhesive 17 can be prevented from passing between the inner peripheral surface of the through hole 7a and the outer peripheral surface of the projection 10e. Thus, even in this case, the adhesive 17 can be prevented from flowing between the front surface of the elastic body 7 and the rear surface 10f.

In the present embodiment, the elastic body 7 is formed from polyurethane foam, and the hardness of the elastic body 7 is relatively low. Thus, in the present embodiment, even when the elastic body 7 is disposed between the lens barrel 3 and the element holder 6 in the optical axis direction, the elastic body 7 can be easily deformed when the inclination of the imaging element 4 relative to the optical axis L is adjusted. Thus, in the present embodiment, even when the elastic body 7 is disposed between the lens barrel 3 and the element holder 6 in the optical axis direction, the work of adjusting the inclination of the imaging element 4 relative to the optical axis L is easy. In the present embodiment, the hardness of the elastic body 7 is relatively low, and hence the degree of adhesion between the elastic body 7 and the contact surface 6f can be increased when the inclination of the imaging element 4 relative to the optical axis L is adjusted.

In the present embodiment, the projection 10e is formed into a columnar shape, and the insertion hole 6d is formed into a circular hole shape. Thus, in the present embodiment, even if stress due to shrinkage of the adhesive 17 acts between the outer peripheral surface of the projection 10e and the inner peripheral surface of the insertion hole 6d when the adhesive 17 filled between the outer peripheral surface of the projection 10e and the inner peripheral surface of the insertion hole 6d is cured, the magnitude of the stress generated between the outer peripheral surface of the projection 10e and the inner peripheral surface of the insertion hole 6d can be made uniform in the entire region in the circumferential direction of the projection 10e. Thus, in the present embodiment, the adjusted relative position between the lens barrel 3 and the element holder 6 can be prevented from being moved in the direction orthogonal to the optical axis direction due to the shrinkage of the adhesive 17.

In the present embodiment, the difference between the outer diameter of the projection 10e and the inner diameter of the insertion hole 6d is equal to or more than twice a margin for adjusting the relative position of the element holder 6 relative to the lens barrel 3 in the direction orthogonal to the optical axis direction. Thus, in the present embodiment, the relative position of the element holder 6 relative to the lens barrel 3 in the direction orthogonal to the optical axis direction can be reliably adjusted.

In the present embodiment, the projections 10e and the insertion holes 6d are formed at three locations, and the lens barrel 3 and the element holder 6 are bonded at three locations. Thus, in the present embodiment, the fixation state of the lens barrel 3 and the element holder 6 can be made stable.

In particular, in the present embodiment, when seen from the front-back direction, the projections 10e formed at two locations on both ends of one long-side part of the base portion 10a are disposed symmetrically about a line parallel to the short-side direction of the base portion 10a and passing through the optical axis L, and when seen from the front-back direction, the projection 10e formed at one location at the center position of the other long-side part of the base portion 10a is disposed at a position at which the line passes. When seen from the front-back direction, the projections 10e formed at the three locations are disposed at equal distances from a line parallel to the long-side direction of the base portion 10a and passing through the optical axis L. When seen from the front-back direction, the insertion holes 6d formed at two locations on both sides of one long-side part of the base portion 6a are disposed symmetrically about a line parallel to the short-side direction of the imaging element 4 formed into a rectangular shape and passing through the center of the imaging element 4, and when seen from the front-back direction, the insertion hole 6d formed at one location at the center position of the other long-side part of the base portion 6a is disposed at a position at which the line passes. When seen from the front-back direction, the insertion holes 6d formed at the three locations are disposed at equal distances from a line parallel to the long-side direction of the imaging element 4 and passing through the center of the imaging element 4. Thus, in the present embodiment, the fixed state of the lens barrel 3 and the element holder 6 can be made more stable.

In the present embodiment, the outer diameter of the elastic body 7 is larger than the outer diameter of the protrusion 10d, and an outer peripheral part of the elastic body 7 is located on the outer peripheral side of the outer peripheral surface of the protrusion 10d. Thus, in the present embodiment, the outer peripheral part of the elastic body 7 can be easily deformed, and, as a result, the inclination of the imaging element 4 relative to the optical axis L can be easily adjusted. In the present embodiment, the protrusion 10d projecting toward the rear side is formed on the rear surface of the base portion 10a, and hence as compared with the case where the protrusion 10d is not formed on the rear surface of the base portion 10a, a gap between the rear surface of the base portion 10a and the front surface of the base portion 6a can be increased. Consequently, in the present embodiment, when the inclination of the imaging element 4 relative to the optical axis L is adjusted, the lens barrel 3 and the element holder 6 can be prevented from easily interfering with each other. Note that the thickness of the elastic body 7 may be increased to increase the gap between the rear surface of the base portion 10a and the front surface of the base portion 6a, but in this case, the outer peripheral part of the thickened elastic body 7 is less deformed.

Modification of Elastic Body

Figure 4:
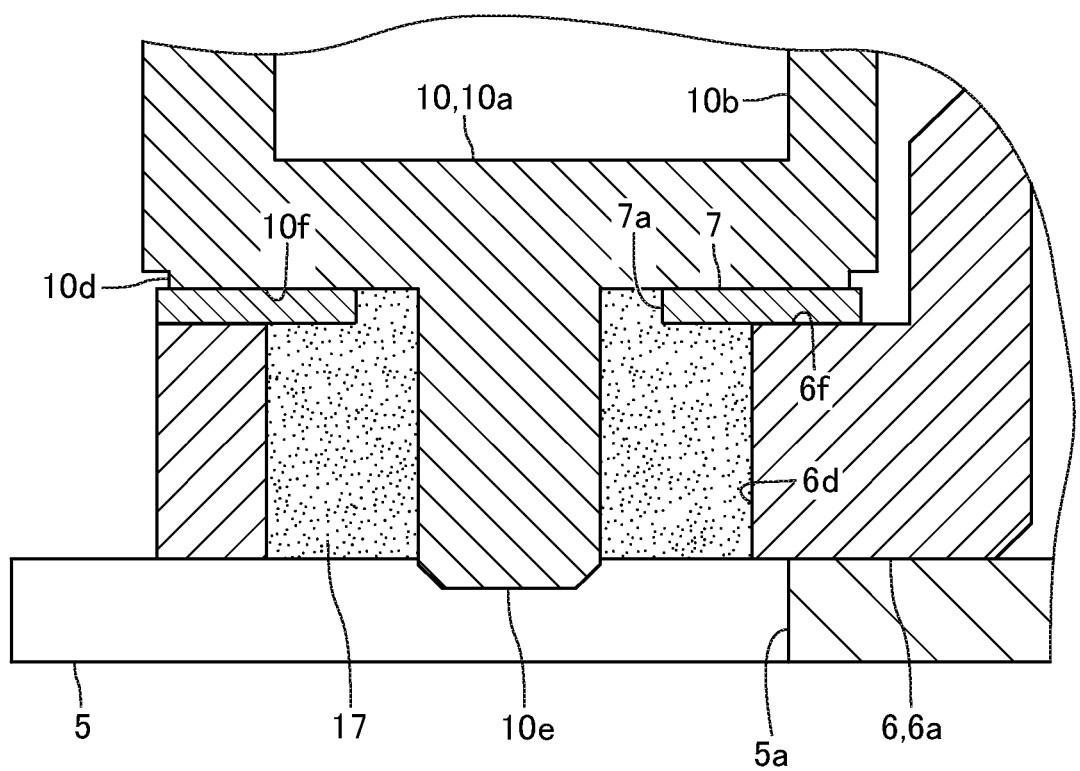
FIG. 4 is an enlarged view for describing a configuration of an elastic body according to another embodiment of the present invention.

FIG. 4 is an enlarged view for describing a configuration of an elastic body 7 according to another embodiment of the present invention.

In the above-mentioned embodiment, the outer peripheral surface of the projection 10e and the inner peripheral surface of the through hole 7a are in contact with each other, but as illustrated in FIG. 4, a gap may be formed between the outer peripheral surface of the projection 10e and the inner peripheral surface of the through hole 7a. In this case, the gap is formed between the outer peripheral surface of the projection 10e and the inner peripheral surface of the through hole 7a, and hence as illustrated in FIG. 4, the adhesive 17 flows to a part of the rear surface 10f that surrounds the projection 10e. In this case, however, the elastic body 7 is disposed at a part at which the lens barrel 3 and the element holder 6 are opposed in the optical axis direction, and hence the adhesive 17 is less likely to flow into this part. Thus, even when the adhesive 17 is cured and shrunk, a stress of shrinkage is less likely to act between the lens barrel 3 and the element holder 6 in the optical axis direction. Consequently, also in the embodiment illustrated in FIG. 4, even when the adhesive 17 is shrunk after the relative position between the lens barrel 3 and the element holder 6 is adjusted, the shift of the relative position between the lens barrel 3 and the element holder 6 in the optical axis direction can be suppressed.

Note that, in this case, it is preferred that the inner diameter of the through hole 7a in the elastic body 7 be equal to or smaller than a value obtained by adding a half value of the difference between the inner diameter of the insertion hole 6d and the outer diameter of the projection 10e to the outer diameter of the projection 10e. By setting the inner diameter of the through hole 7a in this manner, even when the elastic body 7 moves in the direction orthogonal to the optical axis direction, the inner peripheral edge of the through hole 7a can be prevented from being located on the outer side of the inner peripheral edge of the insertion hole 6d. The inner peripheral edge of the through hole 7a can be prevented from being located on the outer side of the inner peripheral edge of the insertion hole 6d, and hence the adhesive 17 can be prevented from easily flowing to a part where the lens barrel 3 and the element holder 6 are opposed in the optical axis direction.

Other Embodiments

Figure 5:
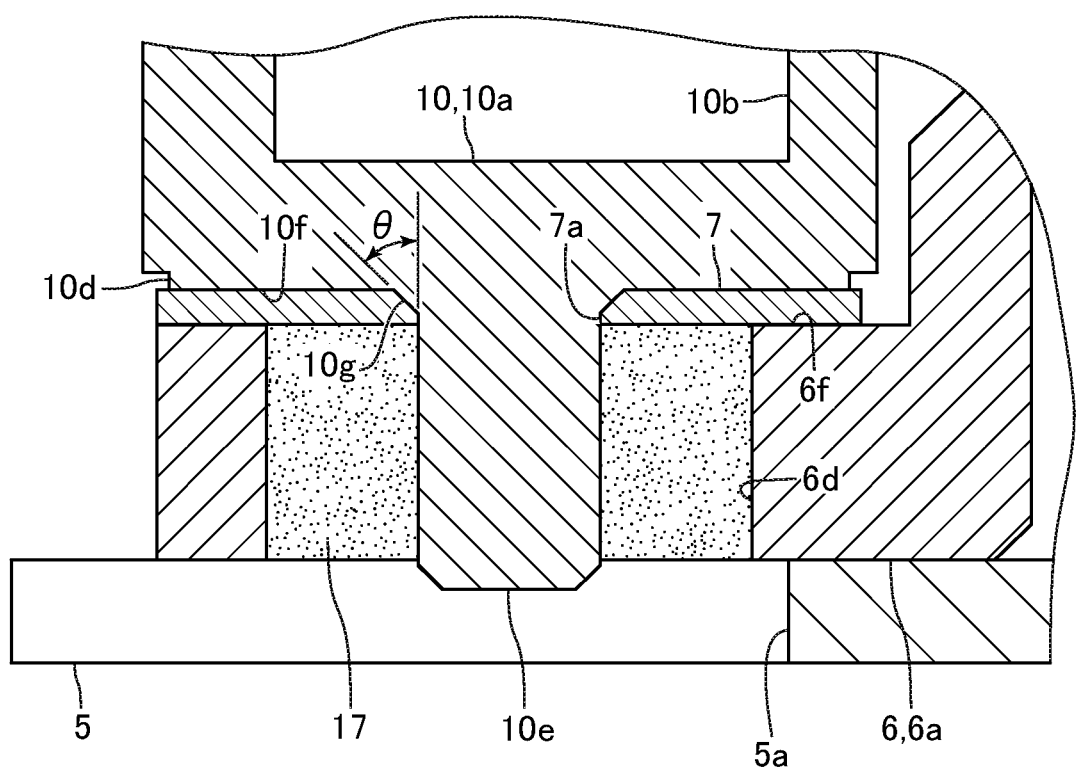
FIG. 5 is an enlarged view for describing a configuration of a projection according to another embodiment of the present invention.

In the above-mentioned embodiment, as illustrated in FIG. 5, a tapered surface 10g having outer diameter that becomes larger toward the front side that is opposite to the projecting direction of the projection 10e may be formed on a root part of the projection 10e (that is, a boundary part (connection part) between the projection 10e and the rear surface 10f). The tapered surface 10g is formed into a truncated cone shape having outer diameter that becomes gradually larger toward the front side. In this case, the degree of adhesion between the outer peripheral surface of the projection 10e and the through hole 7a in the elastic body 7 (specifically, the degree of adhesion between the outer peripheral surface of the root part of the projection 10e and the inner peripheral surface of the through hole 7a) can be further increased. Thus, the adhesive 17 can be effectively prevented from passing between the inner peripheral surface of the through hole 7a and the outer peripheral surface of the projection 10e to flow between the front surface of the elastic body 7 and the rear surface 10f.

Note that it is preferred that the inclination angle $\theta$ of the tapered surface 10g relative to the front-back direction be 15° or more and 60° or less. The reason is that when the inclination angle $\theta$ is less than 15°, a large effect of increasing the degree of adhesion between the outer peripheral surface of the projection 10e and the inner peripheral surface of the through hole 7a cannot be expected. The reason is that when the inclination angle $\theta$ exceeds 60°, the degree of adhesion between the outer peripheral surface of the projection 10e and the inner peripheral surface of the through hole 7a may be decreased. The tapered surface 10g may be formed into a convex curved shape or a concave curved shape having outer diameter that becomes larger toward the front side.

In the above-mentioned embodiment, the inner diameter of the insertion hole 6d is about three times the outer diameter of the projection 10e, but the inner diameter of the insertion hole 6d may be smaller than three times the outer diameter of the projection 10e or larger than three times the outer diameter of the projection 10e. It is preferred that the inner diameter of the insertion hole 6d be equal to or smaller than five times the outer diameter of the projection 10e. When a gap between the outer peripheral surface of the projection 10e and the inner peripheral surface of the insertion hole 6d varies in the circumferential direction of the projection 10e (that is, when the projection 10e is not disposed at the center of the insertion hole 6d), the magnitude of stress generated between the outer peripheral surface of the projection 10e and the inner peripheral surface of the insertion hole 6d when the adhesive 17 filled between the outer peripheral surface of the projection 10e and the inner peripheral surface of the insertion hole 6d is cured varies depending on the position in the circumferential direction of the projection 10e. In this case, when the inner diameter of the insertion hole 6d exceeds five times the outer diameter of the projection 10e, the magnitude of stress generated between the outer peripheral surface of the projection 10e and the inner peripheral surface of the insertion hole 6d is likely to be nonuniform in the circumferential direction of the projection 10e. On the other hand, when the inner diameter of the insertion hole 6d is equal to or smaller than five times the outer diameter of the projection 10e, the magnitude of stress generated between the outer peripheral surface of the projection 10e and the inner peripheral surface of the insertion hole 6d is likely to be uniform in the circumferential direction of the projection 10e.

In the above-mentioned embodiment, the projection 10e is formed on the lens barrel 3, and the insertion hole 6d is formed in the element holder 6, but a projection projecting toward the lens barrel 3 (that is, toward the front side) may be formed on the element holder 6, and an insertion hole into which the projection is inserted may be formed in the lens barrel 3. In this case, for example, a flat plate-shaped flat plate portion projecting to the direction orthogonal to the front-back direction is formed on the base portion 10a of the cover member 10, and the insertion hole is formed in the flat plate portion so as to pass through the flat plate portion. In this case, when the imaging device 1 is assembled, the adhesive 17 is poured from the front side of the insertion hole. In this case, a first contact portion that the elastic body 7 contacts is formed on the element holder 6 so as to surround the projection, and a second contact portion that the elastic body 7 contacts is formed on the lens barrel 3 along the entire circumference of the edge of the insertion hole. In the above-mentioned embodiment, it is unnecessary to form the flat plate portion on the base portion 10a, and hence the configuration of the lens barrel 3 can be simplified more in the above-mentioned embodiment.

In the above-mentioned embodiment, the elastic body 7 is formed from polyurethane foam, but the elastic body 7 may be formed from a material other than polyurethane foam. Specifically, the elastic body 7 only needs to be formed from a material that elastically deforms so as not to hinder the adjustment of the inclination of the imaging element 4 relative to the optical axis L and contacts the contact surface 6f or the rear surface 10f. For example, the elastic body 7 may be formed by foamed rubber other than polyurethane foam, may be formed by sponge, or may be formed by felt. In the above-mentioned embodiment, the elastic body 7 is formed into a ring shape, but the elastic body 7 may be formed into a polygonal ring shape such as a square ring shape.

In the above-mentioned embodiment, three elastic bodies 7 into which three projections 10e are inserted, respectively, are disposed between the lens barrel 3 and the element holder 6, but one elastic body 7 in which three projections 10e are inserted may be disposed between the lens barrel 3 and the element holder 6. In this case, for example, the elastic body 7 is formed into a rectangular frame shape conforming to the shapes of the base portions 6a and 10a, and the entire front surface of the base portion 6a serves as a second contact portion that the elastic body 7 contacts. In this case, for example, the elastic body 7 is in contact with the entire front surface of the base portion 6a.

In the above-mentioned embodiment, the outer diameter of the protrusion 10d is smaller than the outer diameter of the elastic body 7, but the outer diameter of the protrusion 10d may be equal to or larger than the outer diameter of the elastic body 7. In the above-mentioned embodiment, the protrusion 10d is not necessarily required to be formed on the cover member 10. In this case, a part of the rear surface of the base portion 10a that surrounds the projection 10e serves as a first contact portion that the elastic body 7 contacts. When the protrusion 10d is not formed on the cover member 10 and the elastic body 7 is formed into a rectangular frame shape conforming to the shapes of the base portions 6a and 10a, the entire rear surface of the base portion 10a serves as a first contact portion that the elastic body 7 contacts.

In the above-mentioned embodiment, when seen from the front-back direction, a straight line connecting the projections 10e formed at three locations forms an isosceles triangle, and a straight line connecting the insertion holes 6d formed at three locations forms an isosceles triangle, but the projections 10e may be formed at three locations such that an equilateral triangle centered around the optical axis L is formed by a straight line connecting the projections 10e formed at the three locations when seen from the front-back direction, and the insertion holes 6d may be formed at three locations such that an equilateral triangle centered around the imaging element 4 is formed by a straight line connecting the insertion holes 6d formed at three locations when seen from the front-back direction. In this case, the fixed state between the lens barrel 3 and the element holder 6 can be made more stable, and the optical axis L and the center of the imaging element 4 can be easily aligned.

In the above-mentioned embodiment, the projections 10e and the insertion holes 6d are formed at three locations, but the projections 10e and the insertion holes 6d may be formed at four or more locations. As long as the fixation strength between the lens barrel 3 and the element holder 6 can be secured, the projections 10e and the insertion holes 6d may be formed at one location or two locations. In the above-mentioned embodiment, the projection 10e is formed into a columnar shape, but the projection 10e may be formed into a conical shape, a truncated conical shape, a polygonal columnar shape, a polygonal pyramidal shape, or a polygonal frustum shape. In the above-mentioned embodiment, the insertion hole 6d is formed into a circular hole shape, but the insertion hole 6d may be formed into a polygonal hole shape such as a square hole shape. In the above-mentioned embodiment, the element holder 6 holds the imaging element 4 through the circuit substrate 5, but the element holder 6 may directly hold the imaging element 4.

The invention claimed is:

1. An imaging device comprising:
a lens barrel for holding a lens;
an element holder adhesively secured to one end of the lens barrel in an optical axis direction of the lens while holding an imaging element; and
an elastic body disposed between the lens barrel and the element holder in the optical axis direction, wherein
one of the lens barrel and the element holder has formed thereon a projection projecting in the optical axis direction toward the other of the lens barrel and the element holder,
the other of the lens barrel and the element holder has formed therein an insertion hole into which the projection is inserted,
the elastic body has formed therein a through hole through which the projection is inserted,
the elastic body is fitted to the projection with the projection inserted in the through hole,
an outer peripheral surface of the projection and an inner peripheral surface of the through hole are in contact with each other,
the other of the lens barrel and the element holder in which the insertion hole is formed and the elastic body fitted to the projection are in contact with each other on a periphery of the insertion hole, and
an adhesive for fixing the lens barrel and the element holder is filled between the outer peripheral surface of the projection and the inner peripheral surface of the insertion hole.

2. The imaging device according to claim 1, wherein the elastic body is formed from polyurethane foam.

3. The imaging device according to claim 1, wherein
the projection is formed into a columnar shape, and
the insertion hole is formed into a circular hole shape.

4. The imaging device according to claim 3, wherein a tapered surface having outer diameter that becomes larger on a side opposite to a projecting direction of the projection is formed on a root part of the projection.

5. The imaging device according to claim 3 wherein
a difference between an outer diameter of the projection and an inner diameter of the insertion hole is equal to or more than twice a margin for adjusting a relative position of the element holder relative to the lens barrel in a direction orthogonal to the optical axis direction, and
the inner diameter of the insertion hole is equal to or smaller than five times the outer diameter of the projection.

6. The imaging device according to claim 1, wherein the projection includes a plurality of projections and the insertion hole include a plurality of insertion holes, the projections and the insertion holes being formed at three locations.

7. The imaging device according to claim 1, wherein
the projection is formed on the lens barrel,
the insertion hole is formed in the element holder, and
the insertion hole is a through hole passing through the element holder in the optical axis direction.

8. An imaging device comprising:
a lens barrel for holding a lens;
an element holder adhesively secured to one end of the lens barrel in an optical axis direction of the lens while holding an imaging element; and
an elastic body disposed between the lens barrel and the element holder in the optical axis direction, wherein
one of the lens barrel and the element holder has formed thereon a projection projecting in the optical axis direction toward the other of the lens barrel and the element holder,
the other of the lens barrel and the element holder has formed therein an insertion hole into which the projection is inserted,
the elastic body has formed therein a through hole through which the projection is inserted,
the elastic body is disposed on an inner side and an outer side of an inner peripheral edge of the insertion hole,
a part of the elastic body that is disposed on the outer side of the inner peripheral edge of the insertion hole is sandwiched between the lens barrel and the element holder in the optical axis direction, and
an adhesive for fixing the lens barrel and the element holder is filled between an outer peripheral surface of the projection and an inner peripheral surface of the insertion hole.

9. The imaging device according to claim 4, wherein
a difference between an outer diameter of the projection and an inner diameter of the insertion hole is equal to or more than twice a margin for adjusting a relative position of the element holder relative to the lens barrel in a direction orthogonal to the optical axis direction, and
the inner diameter of the insertion hole is equal to or smaller than five times the outer diameter of the projection.

10. The imaging device according to claim 2, wherein the projection includes a plurality of projections and the insertion hole include a plurality of insertion holes, the projections and the insertion holes being formed at three locations.

11. The imaging device according to claim 2, wherein
the projection is formed on the lens barrel,
the insertion hole is formed in the element holder, and
the insertion hole is a through hole passing through the element holder in the optical axis direction.

12. The imaging device according to claim 3, wherein the projection includes a plurality of projections and the insertion hole include a plurality of insertion holes, the projections and the insertion holes being formed at three locations.

13. The imaging device according to claim 3, wherein
the projection is formed on the lens barrel,
the insertion hole is formed in the element holder, and
the insertion hole is a through hole passing through the element holder in the optical axis direction.

* * * * *